(12) United States Patent
Bar-Lev

(10) Patent No.: US 8,157,273 B2
(45) Date of Patent: Apr. 17, 2012

(54) ADJUSTABLE STROLLER

(76) Inventor: Amir Bar-Lev, Motzkin (IL)

( * ) Notice: Subject to any disclaimer, the term of this patent is extended or adjusted under 35 U.S.C. 154(b) by 465 days.

(21) Appl. No.: 12/193,012

(22) Filed: Aug. 17, 2008

(65) Prior Publication Data
US 2010/0038887 A1   Feb. 18, 2010

(51) Int. Cl.
*B62B 7/00* (2006.01)
(52) U.S. Cl. .................. 280/47.39; 280/47.38; 280/648; 280/650
(58) Field of Classification Search .................. 280/643, 280/648, 649, 47.39, 47.4, 47.41; 297/232–257
See application file for complete search history.

(56) References Cited

U.S. PATENT DOCUMENTS

| | | | | |
|---|---|---|---|---|
| 522,608 | A | * | 7/1894 | Macklin ........................ 297/242 |
| 1,707,186 | A | * | 3/1929 | Hall .............................. 280/658 |
| 3,223,431 | A | * | 12/1965 | Gottfried et al. ........... 280/47.38 |
| 3,524,655 | A | | 8/1970 | Ballenger |
| 3,997,180 | A | | 12/1976 | Okubo |
| 4,620,686 | A | * | 11/1986 | Conant ........................ 248/415 |
| 4,632,409 | A | | 12/1986 | Hall et al. |
| 4,836,573 | A | | 6/1989 | Gebnard |
| 6,267,406 | B1 | | 7/2001 | Huang |
| 6,752,405 | B1 | | 6/2004 | Wright |
| 7,364,183 | B2 | | 4/2008 | Lee |

FOREIGN PATENT DOCUMENTS

| | | |
|---|---|---|
| GB | 2193692 | 2/1988 |
| GB | 2368824 | 5/2002 |
| WO | WO/2008/135974 | 11/2008 |

* cited by examiner

*Primary Examiner* — Katy M Ebner
(74) *Attorney, Agent, or Firm* — Law Offices of Edward Langer Adv. and Patent Attorney

(57) ABSTRACT

In one embodiment, the present invention is directed to an adjustable stroller, comprising: a central axle, which is an axle attached to the chassis of the adjustable stroller such that the axis of the central axle is disposed substantially vertically; a pedestal, attached in the center thereof to the central axle such that the edges thereof are substantially at the same elevation; two side axles, each being an axle attached to an opposite side of the pedestal such that the axis thereof is disposed vertically; and two baby seats, each attached to one of the side axles; thereby allowing arranging the seats in a manner selected from a group comprising: side by side, and in tandem mode. Preferably, each of the axles further comprises a securing mechanism, for securing the outer cylinder of the axle in a desired manner with regard to the inner cylinder thereof.

25 Claims, 9 Drawing Sheets

ADJUSTABLE STROLLER

FIELD OF THE INVENTION

The present invention relates to the field of baby carriers. More particularly, the invention relates to an adjustable stroller.

BACKGROUND OF THE INVENTION

Adjustable strollers are well known in the art. For example, U.S. Pat. No. 6,267,406 presents a folding-collapsible double-seat baby stroller with the seats thereof disposed side by side.

U.S. Pat. No. 6,752,405 presents a convertible twin/single seat stroller for providing a two-in-one stroller that can be expanded to carry two children. In this publication, the seats are disposed in tandem mode.

However, no prior art publication has presented an adjustable stroller in which the seats can be arranged side by side as well as in tandem mode.

The object (or concept) of the Adjustable stroller is a tandem stroller that would be capable of converting to a side by side stroller, depending on the user's needs.

Another object (or concept) of the Adjustable stroller is to enable to configure the stroller to use one or two seats.

Other objects and advantages of the invention will become apparent as the description proceeds.

SUMMARY OF THE INVENTION

The following embodiments and aspects thereof are described and illustrated in conjunction with systems, tools methods, and so forth, which are meant to be merely illustrative, not limiting in scope.

In one embodiment, the present invention is directed to an adjustable stroller, comprising:
- a central axle (an axle attached to the chassis of the adjustable stroller such that the axis of the central axle is disposed substantially vertically);
- a pedestal, attached in the center thereof to the central axle such that the edges thereof are substantially at the same elevation;
- two side axles, each being attached to an opposite side of the pedestal such that the axis thereof is disposed vertically; and
- two baby seats, each attached to one of the side axles;

thereby allowing arranging the seats selected from a group comprising: side by side, and in tandem mode.

Preferably, each of the axles further comprises a securing mechanism, for securing the outer cylinder of the axle with regard to the inner cylinder thereof.

According to one embodiment of the invention, the securing mechanism comprises a pin and at least one corresponding hole.

According to another embodiment of the invention, the securing mechanism comprises a clamp on an outer cylinder of one of the axles and corresponding surface on the inner cylinder thereof.

According to yet another embodiment of the invention, the securing mechanism comprises a threaded bolt attached to the outer cylinder thereof, pressing the surface of the inner cylinder thereof.

According to yet another embodiment of the invention, the securing mechanism comprises a ball connected to one of the cylinders of an axle pressed towards the other cylinder of the axle.

According to one embodiment of the invention, the central axle is attached to the chassis of the adjustable stroller in the center of the chassis.

The central axle may comprise a mechanism for attaching thereof a baby seat.

The pedestal may comprise means for adjusting the distance of the side axles from the center of the pedestal, such as using a telescopic pole as the pedestal (not illustrated herein).

One of the seats may be replaced with a shopping basket.

According to one embodiment of the invention, the stroller further comprises a mechanism for adjusting the elevation of each of the seats thereof.

Each of the axles may comprise an expansion mechanism, such as a plurality of segments, holes and a corresponding pin, a telescopic bar, etc., thereby enabling adjustment of the seats' elevation.

According to one embodiment of the invention, the angle of the back support and/or feet support of the seats of the stroller is adjustable, thereby enabling turning the seat into bed form to allow the infant(s) to sleep.

According to one embodiment of the invention, each of the seats is coupled with a foot pedal (not illustrated), for adjusting the elevation of the seat, thereby sparing for the user thereof the need to bend when adjusting the elevation of a seat.

According to one embodiment of the invention, each of the seats is separable from the adjustable stroller, thereby allowing placing the seat in a car.

In a further embodiment of the invention, each of the seats comprises a mechanism for connecting the seat to a facility in a car, such as to a security belt of the car.

According to one embodiment of the invention, each of the seats comprises one or more handles (not illustrated) for carrying the seat by a user when the seat is separated from the stroller.

According to one embodiment of the invention, each of the seats can be turned with the face backwards and with the face forwards.

The frame thereof may be designed to be foldable, thereby resulting with a compact storage in order to be carried by a vehicle.

Preferably, the length of the handle for pushing the stroller is as the width one of each of the seats thereof. The structure of the handle allows turning each of the seats with the face to the front and back of said stroller.

The chassis of said the stroller may be square, as well as trapezoid, parallelogram, and so on.

The major advantage of the present invention over the prior art is that the present invention allows using the same stroller for carrying one infant, two infants, in tandem mode or side by side, the ability to change the position of a seat with regard to the driving direction, and so on.

In addition to the exemplary aspects and embodiments described above, further aspects and embodiments will become apparent by reference to the figures and by study of the following detailed description.

BRIEF DESCRIPTION OF THE DRAWINGS

The objects and features of the present invention will become apparent from the following detailed description considered in conjunction with the accompanying drawings, in which.

Figure 8A:
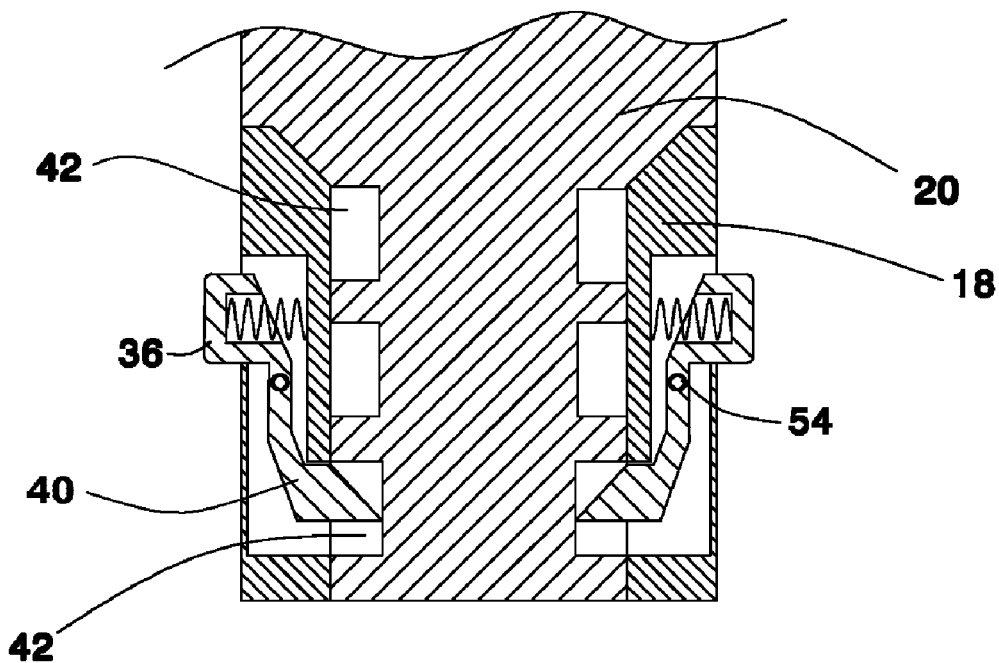
Figure 8B:
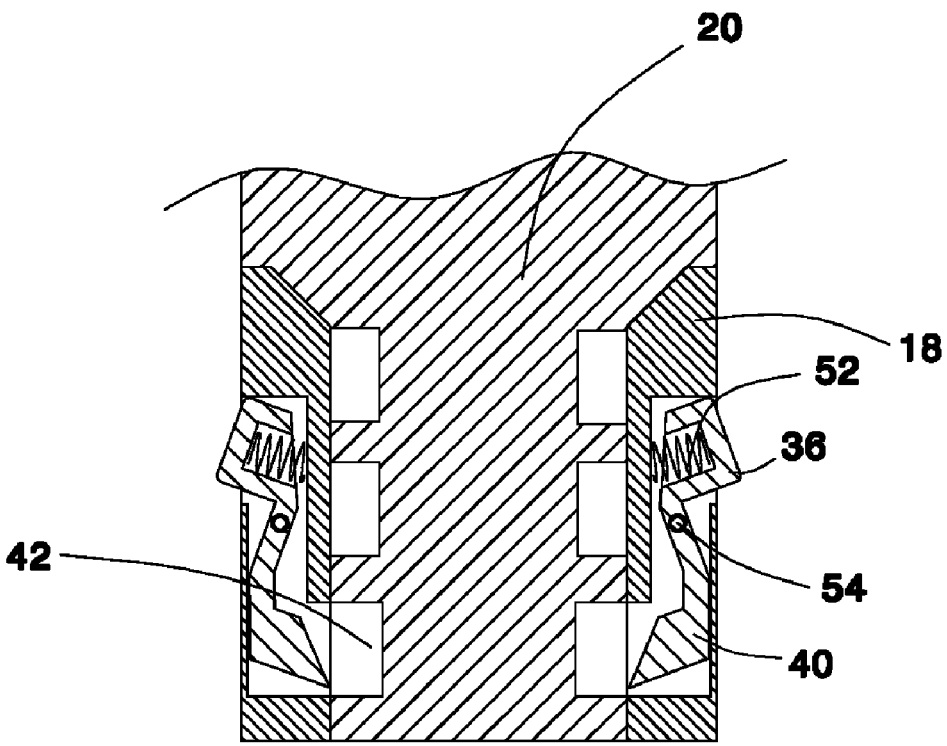

Each of FIGS. 8a and 8b is a sectional view along a side axle, which schematically illustrates the securing mechanism thereof, according to a preferred embodiment of the invention.

Figure 9:
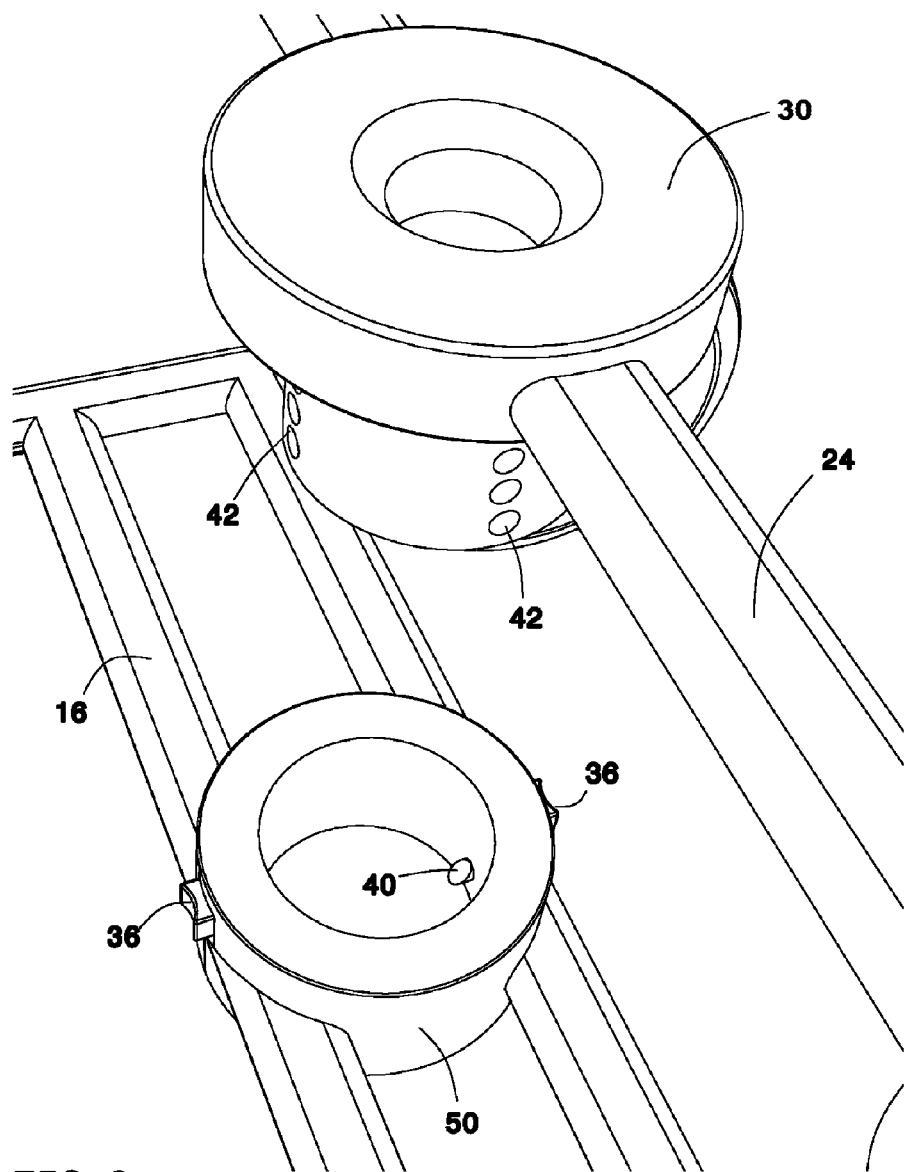

FIG. 9 is a zoomed exploded view on the central axle, according to one embodiment of the invention.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, are merely intended to conceptually illustrate the structures and procedures described herein. Reference numerals may be repeated among the figures in order to indicate corresponding or analogous elements.

DETAILED DESCRIPTION OF PREFERRED EMBODIMENTS

In the following detailed description, numerous specific details are set forth in order to provide a thorough understanding of the invention. However, it will be understood by those skilled in the art that the present invention may be practiced without these specific details. In some instances, well-known methods, procedures, components and circuits have not been described in detail, for the sake of brevity.

Figure 1:
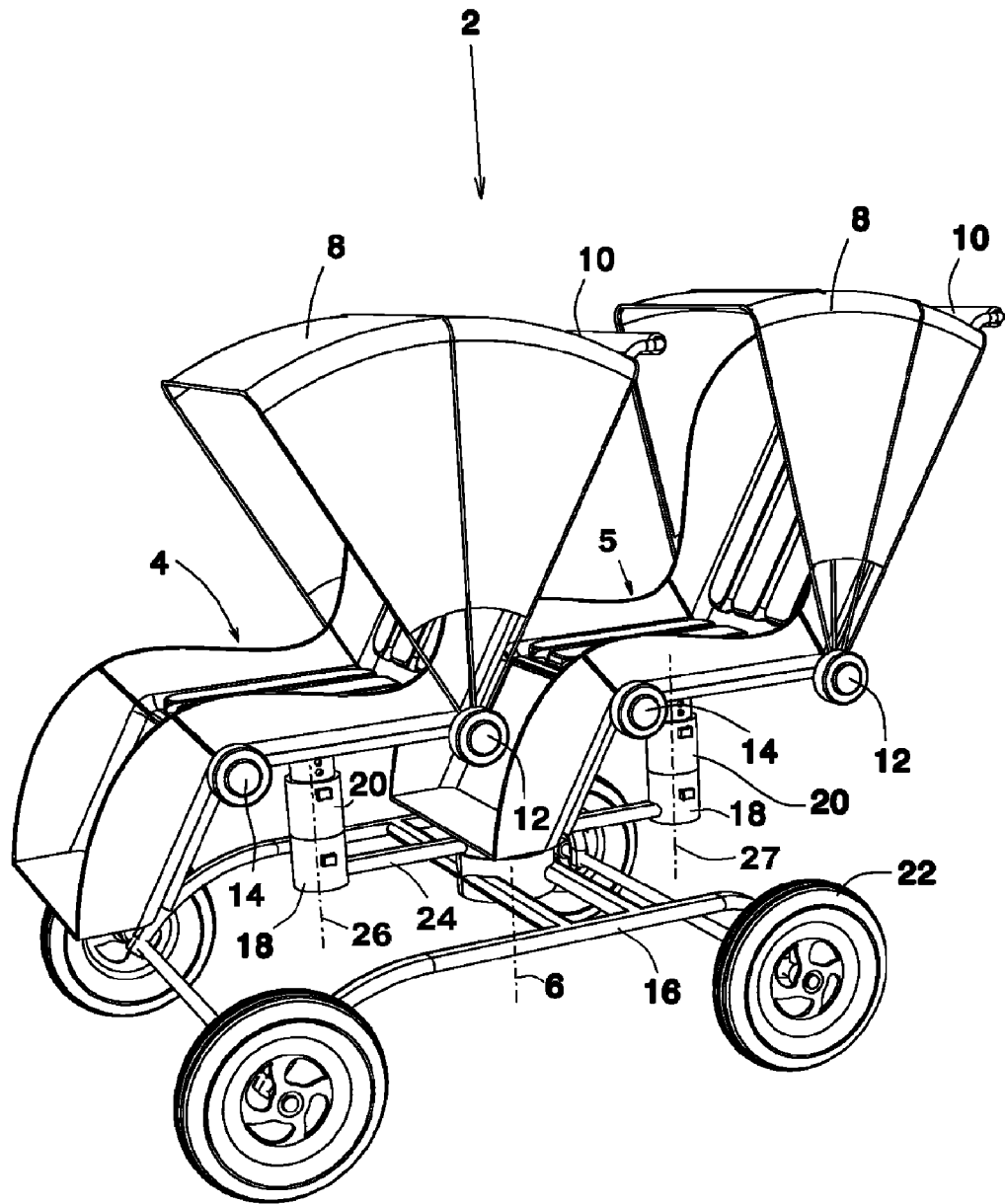
FIG. 1 schematically illustrates an adjustable stroller, according to one embodiment of the invention. The seats in FIG. 1 are arranged in tandem mode.

FIG. 1 schematically illustrates an adjustable stroller, according to one embodiment of the invention. The seats thereof are arranged in tandem mode.

Figure 2:
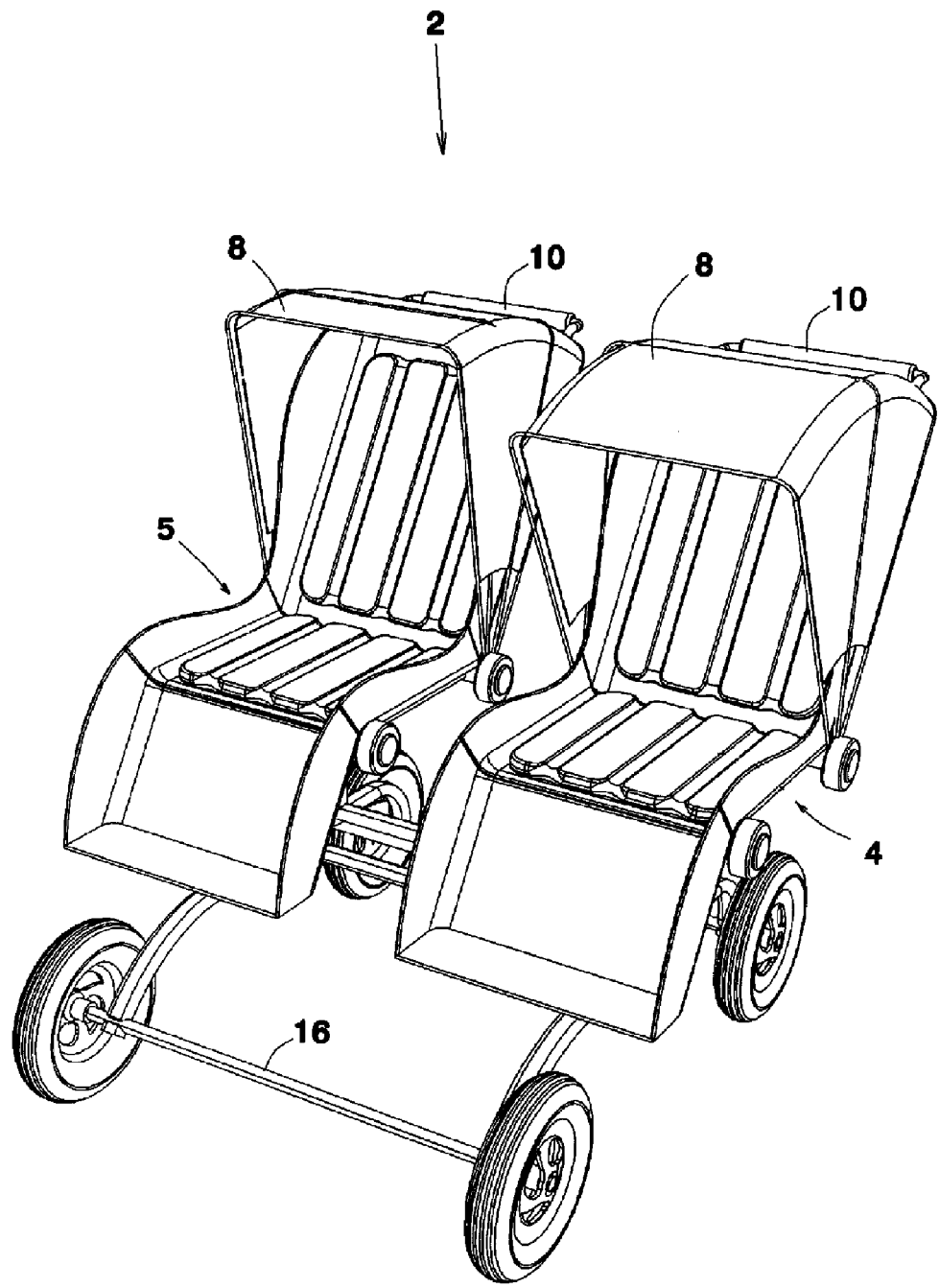
FIG. 2 schematically illustrates the adjustable stroller of FIG. 1, wherein the seats are arranged side by side.

FIG. 2 schematically illustrates the adjustable stroller of FIG. 1, wherein the seats are arranged side by side.

Figure 3:
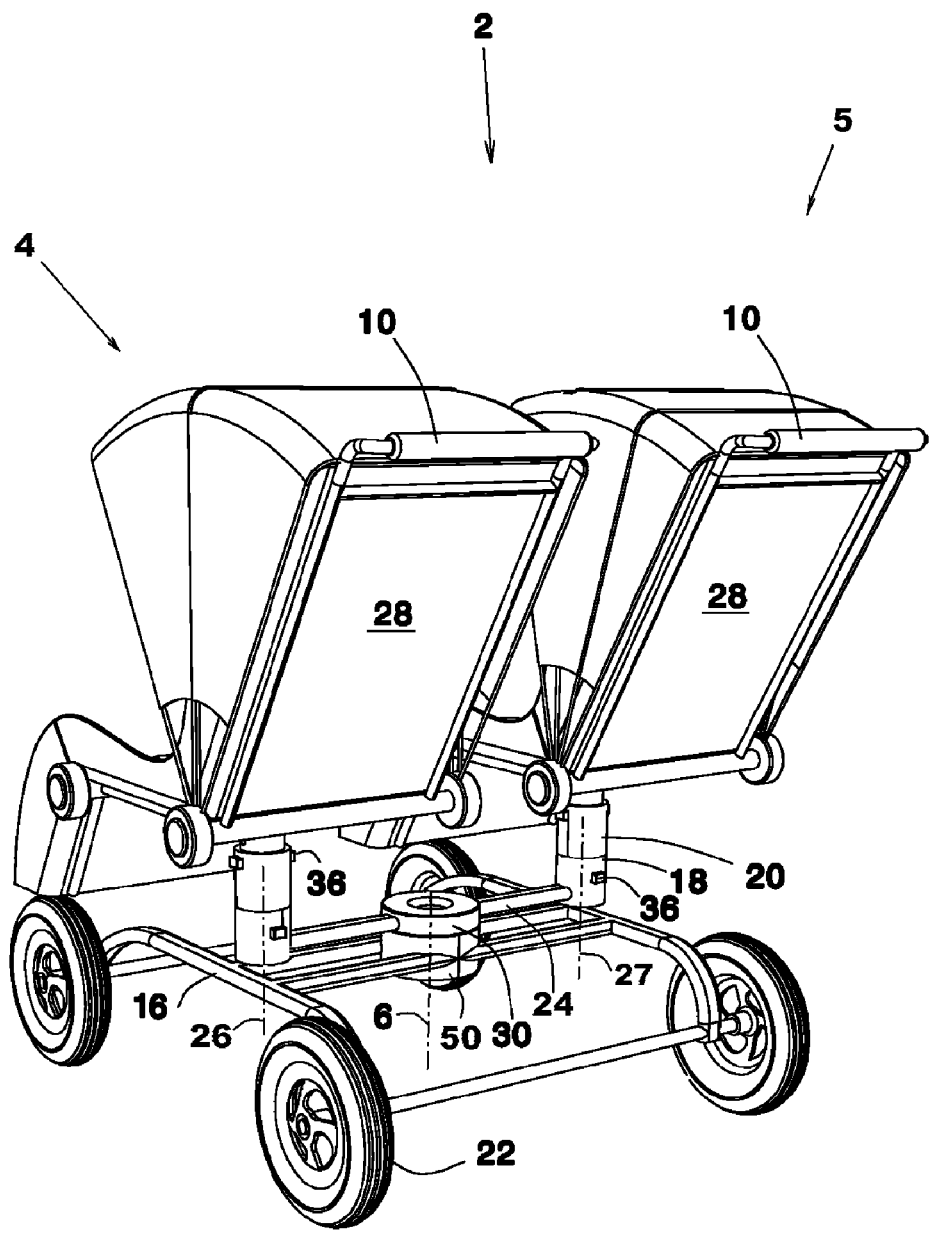
FIG. 3 is a back view of the adjustable stroller illustrated in FIG. 2.

FIG. 3 is a back view of the adjustable stroller illustrated in FIG. 2.

Figure 4:
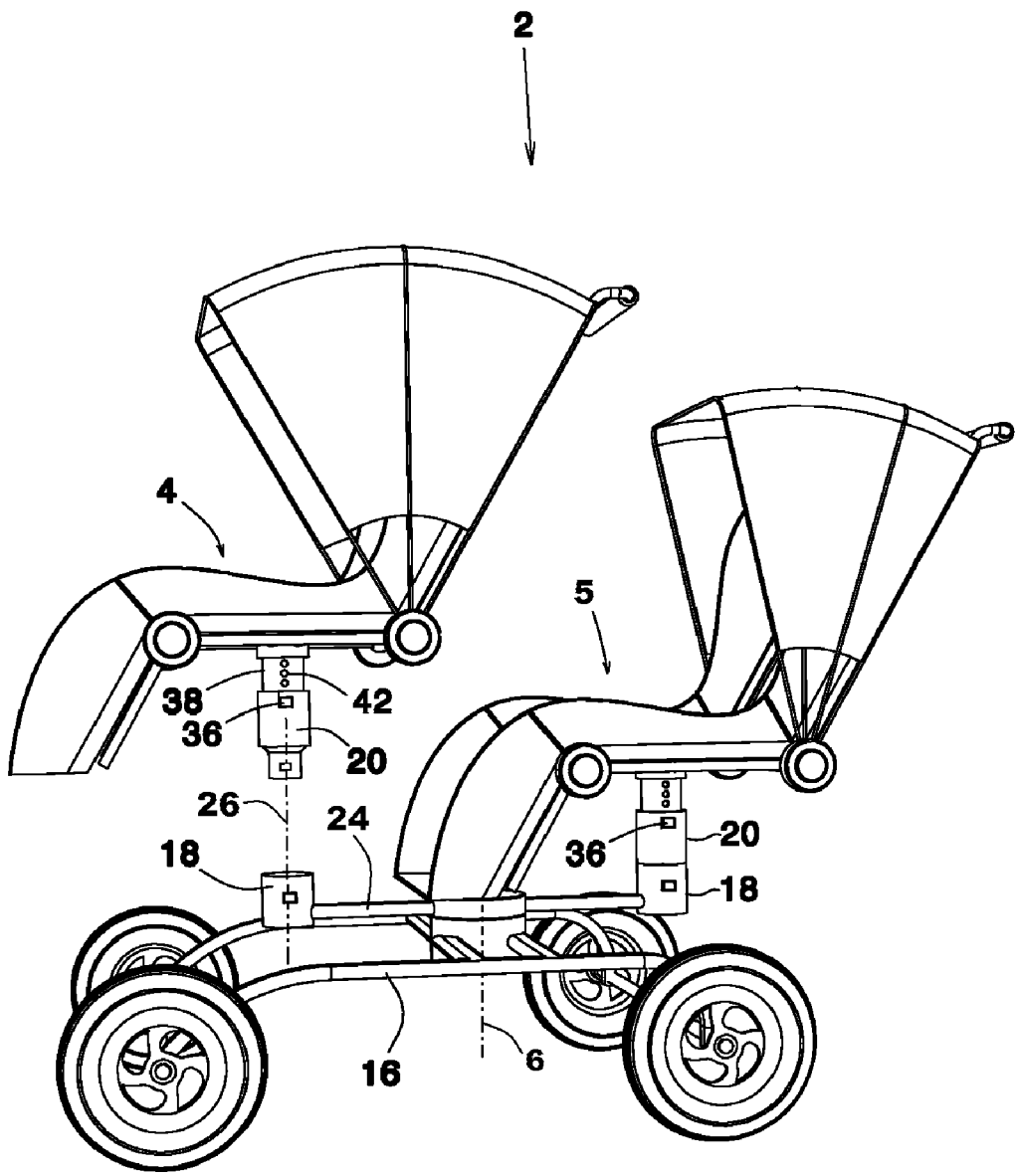
FIG. 4 is an exploded view of the adjustable stroller illustrated in FIG. 1, which specifies the mechanical structure that allows arranging the seats side by side and in tandem mode.

FIG. 4 is an exploded view of the adjustable stroller illustrated in FIG. 1, which specifies the mechanical structure that allows seat arrangement side by side as well as in tandem mode.

The structure that allows seat arrangement side by side as well as in tandem mode comprises:
- a central axle (the axis thereof is marked herein by reference numeral 6), which is an axle attached to the chassis (marked herein by numeral 16) of the adjustable stroller, preferably in the center thereof, such that the axis of the central axle is disposed vertically;
- a pedestal (marked herein by reference numeral 24), such as a bar, attached in the middle thereof to the central axle such that the pedestal is disposed horizontally;
- two side axles (the axes thereof are marked by reference numerals 26 and 27), each attached to an opposite side of pedestal 24 such that the axis of each axle is disposed vertically; and
- two seats (marked herein by reference numerals 4 and 5), each attached to one of the side axles.

The term axle refers herein to a mechanism for connecting two objects such that one is rotatable around an imaginary axis. In the examples herein, each of the axles comprises two interlacing cylinders, but it should be noted that an axle might be embodied by other mechanisms.

The central axle and the pedestal thereof generate a structure similar to a carousel.

The central axle allows rotating the pedestal with reference to the chassis of the stroller, and each of side axles allows rotating a seat correspondingly with reference to the pedestal. The possibility of rotating the central axle as well as side axles enables arranging the stroller seats side by side as well as in tandem mode.

In addition, each axle comprises a securing mechanism, for securing the device attached to the axle in a desired manner. For example, in order to arrange the seats in tandem mode, the user must release the securing mechanism of the central axle, to rotate the pedestal to the desired arrangement, and then reactivate the securing mechanism. The same process must be carried out with the side axles.

According to the illustrated embodiment, each of the axles comprises an outer cylinder and an inner cylinder. As per the central axle, the outer cylinder is attached to the chassis, while the inner cylinder is attached to the pedestal. As per each of the side axles, the outer cylinder is attached to the pedestal, and the inner cylinder is attached to the seat thereof.

In the illustrated embodiment, the securing mechanism is based on a pin connected to the outer cylinder of an axle, and a corresponding hole at the inner cylinder thereof.

Those skilled in the art will appreciate that a securing mechanism may be embodied in different ways. For example, alternative securing mechanisms may be a bolt inserted through holes in the inner and outer cylinders, a clamp attached to the outer cylinder of an axle and a corresponding surface at the surface of the inner cylinder, a ball connected to the inner cylinder and pressed by a spring towards a depression on the outer cylinder, a ball connected to the outer cylinder and pressed by a spring towards a depression on the inner cylinder, and many other means.

The inner cylinder of the central axle may be in the form of a pipe, i.e., the inner cylinder is hollow, thereby allowing connecting thereof additional segments in order to elongate the axle, e.g., for disposing a seat at a higher elevation.

It should be noted that each of the seats might be set to "sleeping mode", i.e., changing the angle of the back support and/or feet support to a bed form.

Figure 5:
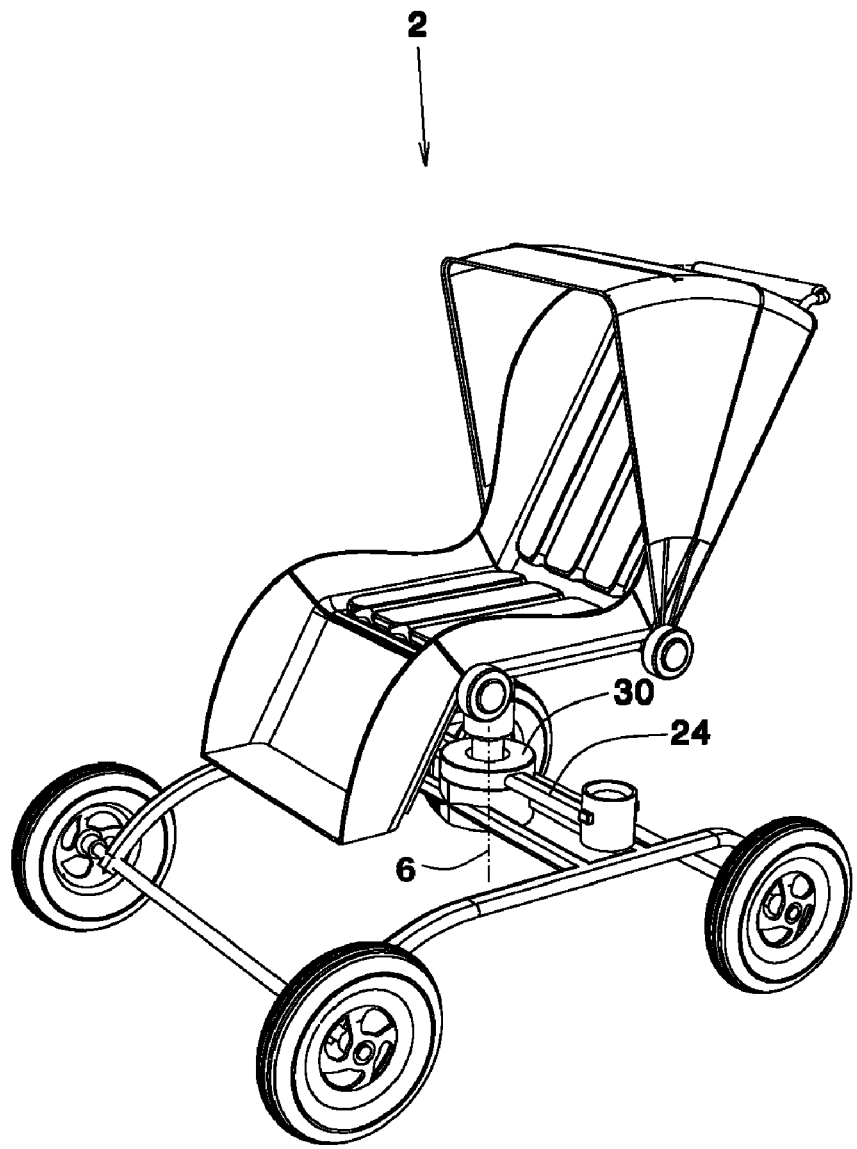
FIG. 5 schematically illustrates an adjustable stroller in which the central axle is used as a support for a seat, according to one embodiment of the invention.
Figure 6:
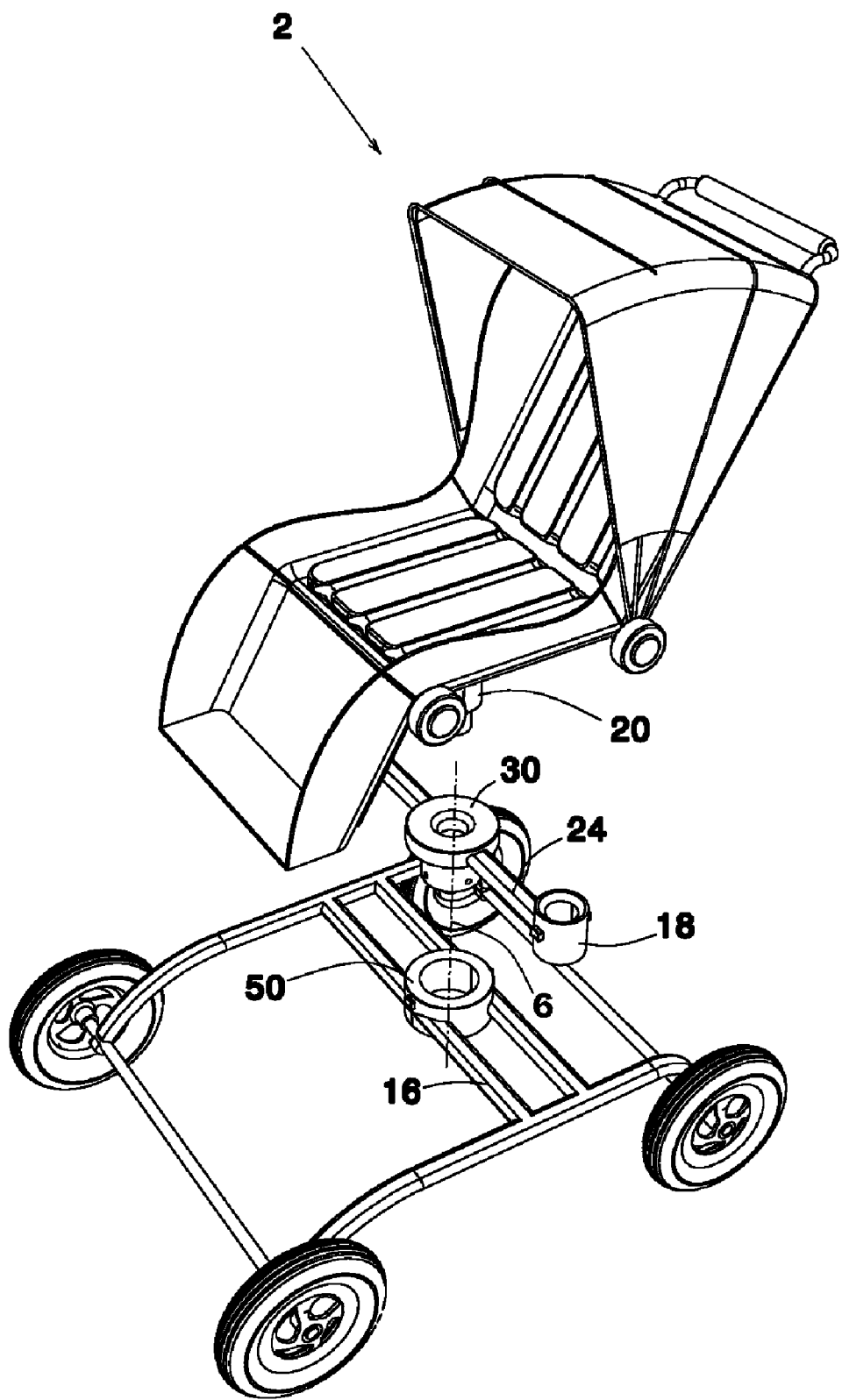
FIG. 6 is an exploded view of FIG. 5.

FIG. 5 schematically illustrates an adjustable stroller in which the central axle is used as a support for a seat, according to one embodiment of the invention. FIG. 6 is an exploded view of FIG. 5.

The pedestal can be made of a telescopic mechanism (not illustrated), thereby allowing expanding the distance of the seats from the center of the pedestal.

Figure 7:
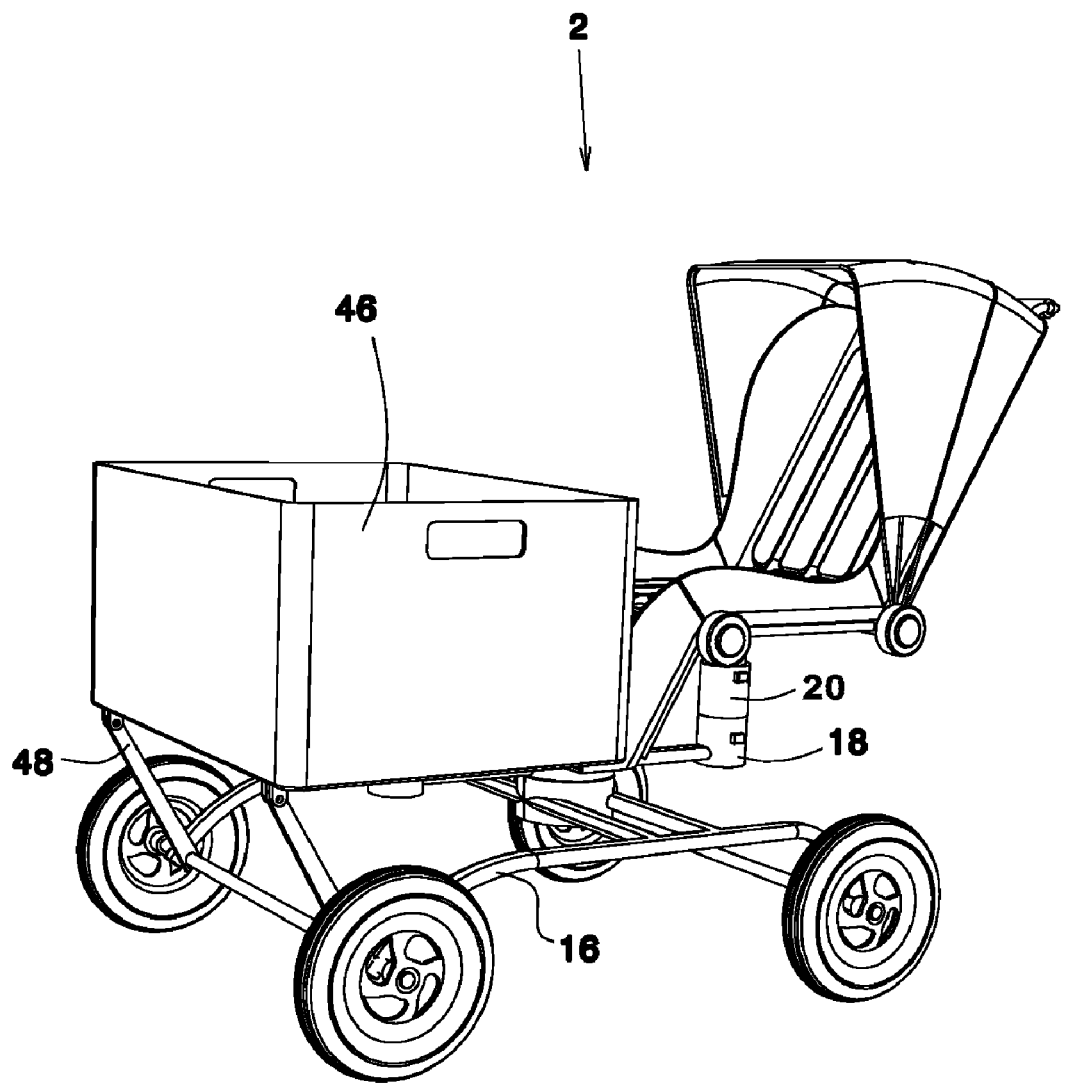
FIG. 7 schematically illustrates an adjustable stroller in which one of the seats is replaced with a shopping basket 46, according to one embodiment of the invention.

FIG. 7 schematically illustrates an adjustable stroller in which one of the seats is replaced by a shopping basket 46, according to one embodiment of the invention.

In this figure, supporting bars 48 are used as a support to the shopping basket, as the load of the basket may be greater than that generated by an infant.

Each of the seats may be set to a desired angle with reference to the stroller. For example, the seats may be set with the infants face towards the one that pushes the stroller. The seats can also be turned such that one infant faces the other, and so on.

According to one embodiment of the invention, each seat may be set at a desired elevation by an anchoring/securing mechanism, which is detailed in FIGS. 8a and 8b.

Each of FIGS. 8a and 8b is a sectional view along a side axle, which schematically illustrates the anchoring/securing mechanism thereof, according to a preferred embodiment of the invention.

In these figures the anchoring/securing mechanism comprises an anchoring pin 40 connected to female connector 18, and a corresponding hole 42, in the male connector 20. Actually, female connector 18 is also the outer cylinder of a side axle, and male connector 20 is also the inner cylinder of the axle.

Reference is made now to FIG. 8b. Upon pressing button 36, as pin 36 rotates around axle 54, pin 40 separates from hole 42, thereby allowing disconnecting part 20 from 18.

Reference is made now to FIG. 8a. Upon releasing button 36, pin 40 is pressed towards inner cylinder 20 by spring 52. Thus, when pin 40 is pushed towards hole 42, it anchors outer cylinder 18 to inner cylinder 20. The hole also prevents rotation, thus the pin and the hole actually serve, additionally, as a securing mechanism.

In addition, it should be noted that there are a plurality of holes 42, arranged vertically each other. This allows adjusting the elevation of the stroller thereof.

FIG. 9 is a zoomed exploded view on the central axle, according to one embodiment of the invention.

Part 30 is the inner cylinder of the central axle, and part 50 is the outer cylinder thereof. Both parts, 30 and 50, are also connectors as the outer cylinder 50 comprises a pin 40 that is used as an anchor corresponding to holes 42 in the inner cylinder 30.

The major advantage of the present invention over the prior art is that the mechanism of the present invention allows using the same stroller for one seat, two seats, in tandem mode or side by side; ability to change the position of a seat with regard to the driving direction, and so on. No stroller of the prior art has the ability to combine all these features.

In addition to the described virtues of the present invention, also the following features can be used with the present invention:

According to one embodiment of the invention, each of the seats is coupled with a foot pedal (not illustrated), for adjusting the elevation of the seat, thereby sparing from the user thereof the need to bend when adjusting the elevation of a seat.

According to one embodiment of the invention, each of the seats is separable from the adjustable stroller, thereby allowing placing the seat in a car.

In a further embodiment of the invention, each of the seats comprises a mechanism for connecting the seat to a facility in a car, such as to a security belt of the car.

According to one embodiment of the invention, each of the seats comprises one or more handles (not illustrated) for carrying the seat by a user when the seat is separated from the stroller.

The frame of the stroller may be designed to be foldable, thereby resulting with a compact storage in order to be carried by a vehicle. In addition, as mentioned above, each of the seats may be disconnected from the stroller, resulting with a more compact structure.

Preferably, the length of the handle for pushing the stroller is as the width one of each of the seats thereof. As mentioned, the structure of the handle allows turning each of the seats with the face to the front and back of said stroller, and so on.

The chassis of the stroller may be square, as well as trapezoid, parallelogram, and so on.

Of course, the size and form of the sunshades may be different from that which is illustrated, and actually, the seats may be designed without sunshades at all.

The front wheels of the illustrated stroller can be rendered rotatable around a vertical axis, thereby allowing easy steering.

Of course, these are merely examples, and other features may be embedded as well in a stroller designed according to embodiments of the present invention. Some of the examples have been presented in order to demonstrate that the present invention does not interfere with employing other features known in the art.

In the figures and/or description herein, the following reference numerals have been mentioned:

numeral 2 denotes an adjustable stroller, according to one embodiment of the invention;
each of numerals 4 and 5 denotes a seat of stroller 2;
numeral 6 denotes the axis of a "central axle";
numeral 8 denotes a sunshade;
numeral 10 denotes a handle for pushing the stroller;
numeral 12 denotes a pushbutton for changing the angle of the back support 28 of a seat with reference to the stroller;
numeral 14 denotes a pushbutton for changing the angle of the foot support of the stroller with reference to the stroller;
numeral 16 denotes the chassis of the stroller;
numeral 18 denotes a female connector, which is also a part of a side axle;
numeral 20 denotes a male connector, which is also a part of a side axle;
numeral 22 denotes a wheel of the stroller;
numeral 24 denotes a pedestal;
each of numerals 26 and 27 denotes the axis of a side axle, which supports a seat 4, 5 respectively;
numeral 28 denotes a back support;
numeral 30 denotes a connector, which is also a part of the central axle;
numeral 36 denotes a button for adjusting the elevation of a seat;
numeral 38 denotes a section in a cylinder's axle;
numeral 40 denotes a pin which is a part of an anchoring mechanism;
numeral 42 denotes a hole corresponding to pin 40;
numeral 46 denotes a shopping basket;
numeral 48 denotes a supporting bar for the shopping basket;
numeral 50 denotes a female connector (which is also a part of the central axle) connected to chassis 16;
numeral 52 denotes a spring; and
numeral 54 denotes an axle of the anchoring pin 40.

While certain features of the invention have been illustrated and described herein, the invention can be embodied in other forms, ways, modifications, substitutions, changes, equivalents, and so forth. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:
1. An adjustable stroller, comprising:
a central axle, having an inner and outer cylinder disposed therein, said central axle being an axle attached to the chassis of said adjustable stroller such that the axis of said central axle is disposed substantially vertically;

a horizontal arm extending from said central axle in both directions, attached in the center thereof to said central axle such that the edges thereof are substantially at the same elevation;

two side axles, each having an inner and outer cylinder disposed therein, said side axles being an axle attached to an opposite side of said horizontal arm such that the axis thereof is disposed vertically, wherein said horizontal arm comprises means for adjusting the distance of said side axles from the center of said horizontal arm;

two baby seats and an independent shopping basket which can be attached or detached from the stroller;

wherein each of said axles further comprises a securing mechanism for securing the respective outer cylinder of said axle in a desired manner with regard to the respective inner cylinder thereof, thereby allowing arrangement of said baby seats and shopping basket in a manner selected from the group consisting of: at least two baby seats side by side, two baby seats in tandem mode, a single baby seat and a single shopping basket side by side, a single baby seat and a single shopping basket in tandem mode, and a single baby seat or a single shopping basket attached to said central axle.

2. An adjustable stroller according to claim 1, wherein said securing mechanism comprises a pin and at least one corresponding hole.

3. An adjustable stroller according to claim 1, wherein said securing mechanism comprises a clamp on an outer cylinder of one of said axles and corresponding surface on the inner cylinder thereof.

4. An adjustable stroller according to claim 1, wherein said securing mechanism comprises a threaded bolt attached to the outer cylinder thereof and pressing the surface of the inner cylinder thereof.

5. An adjustable stroller according to claim 1, wherein said securing mechanism comprises a ball connected to one of the cylinders of an axle and pressed towards the other cylinder of said axle.

6. An adjustable stroller according to claim 1, wherein said central axle is attached to the chassis of said adjustable stroller in the center of said chassis.

7. An adjustable stroller according to claim 1, wherein said central axle comprises a mechanism for attaching thereof a baby seat.

8. An adjustable stroller according to claim 7, wherein said means for adjusting the distance of said side axles from the center of said horizontal arm comprise a telescopic pole.

9. An adjustable stroller according to claim 1, further comprising a mechanism for adjusting the elevation of each of said seats.

10. An adjustable stroller according to claim 1, wherein at least one of said axles comprises an expansion mechanism, thereby enabling to adjust the elevation of a seat thereof.

11. An adjustable stroller according to claim 10, wherein said expansion mechanism comprises a telescopic pole.

12. An adjustable stroller according to claim 10, wherein said expansion mechanism comprises a plurality of holes along the inner and outer cylinders of an axle, and a corresponding pin.

13. An adjustable stroller according to claim 10, wherein said expansion mechanism comprises a plurality of segments of the axle.

14. An adjustable stroller according to claim 1, wherein the angle of the back support and/or feet support of each of said seats is adjustable, thereby enabling to turn each seat into a bed form.

15. An adjustable stroller according to claim 9, wherein the mechanism for adjusting the elevation of each of said seats comprises a foot pedal, thereby sparing from the user thereof the need to bend when adjusting the elevation of a seat.

16. An adjustable stroller according to claim 1, wherein each of said seats comprises means for connecting the seat to a facility in a vehicle.

17. An adjustable stroller according to claim 1, wherein each of said seats comprises one or more handles for carrying the seat by a user thereof when separated from said stroller.

18. An adjustable stroller according to claim 1, wherein each of said seats can be turned with the face backwards.

19. An adjustable stroller according to claim 1, wherein each of said seats can be turned with the face forwards.

20. An adjustable stroller according to claim 1, wherein the frame thereof is foldable, thereby resulting with a compact storage.

21. An adjustable stroller according to claim 1, wherein the length of a handle for pushing the stroller is the same as the width one of each of the seats thereof.

22. An adjustable stroller according to claim 21, wherein the structure of said handle allows turning each of the seats with the face to the front and back of said stroller.

23. An adjustable stroller according to claim 1, wherein the form of the chassis of said stroller is square.

24. An adjustable stroller according to claim 1, wherein the form of the chassis of said stroller is trapezoid.

25. An adjustable stroller according to claim 1, wherein the form of the chassis of said stroller is parallelogram.

* * * * *